(12) United States Patent
Honnorat et al.

(10) Patent No.: US 8,087,723 B2
(45) Date of Patent: Jan. 3, 2012

(54) CRASHWORTHY SEAT FOR A VEHICLE

(75) Inventors: Olivier Honnorat, Aix en Provence (FR); Thomas Manfredotti, La Colle sur Loup (FR); Olivier Feuillarade, Marseilles (FR)

(73) Assignee: Eurocopter, Marignane Cedex (FR)

( * ) Notice: Subject to any disclaimer, the term of this patent is extended or adjusted under 35 U.S.C. 154(b) by 358 days.

(21) Appl. No.: 12/431,097

(22) Filed: Apr. 28, 2009

(65) Prior Publication Data
US 2009/0267390 A1    Oct. 29, 2009

(30) Foreign Application Priority Data

Apr. 28, 2008 (FR) ...................................... 08 02359

(51) Int. Cl.
*B60N 2/42* (2006.01)
(52) U.S. Cl. ................ 297/216.17; 244/122 R; 248/548
(58) Field of Classification Search ............ 297/216.17; 244/122 R, 141; 248/548, 580, 602, 611
See application file for complete search history.

(56) References Cited

U.S. PATENT DOCUMENTS

| | | | | |
|---|---|---|---|---|
| 3,326,603 A | * | 6/1967 | Lehner | 297/308 |
| 3,447,833 A | | 6/1969 | Rice | |
| 3,482,872 A | | 12/1969 | Chamberlain | |
| 3,572,828 A | * | 3/1971 | Lehner | 297/308 |
| 3,985,388 A | | 10/1976 | Hogan | |
| 4,662,597 A | * | 5/1987 | Uecker et al. | 248/564 |
| 4,838,514 A | * | 6/1989 | Hill | 248/577 |
| 5,125,598 A | | 6/1992 | Fox | |
| 5,176,356 A | * | 1/1993 | Lorbiecki et al. | 248/577 |
| 5,788,185 A | * | 8/1998 | Hooper | 244/122 R |
| 5,842,669 A | * | 12/1998 | Ruff | 244/122 R |
| 7,775,479 B2 | * | 8/2010 | Benthien | 244/122 R |
| 2007/0029444 A1 | * | 2/2007 | Mercier et al. | 244/122 R |
| 2009/0267391 A1 | * | 10/2009 | Honnorat et al. | 297/216.17 |
| 2011/0079681 A1 | * | 4/2011 | Honnorat | 244/122 R |
| 2011/0147562 A1 | * | 6/2011 | Auger et al. | 248/548 |

FOREIGN PATENT DOCUMENTS

| | | |
|---|---|---|
| BE | 646747 | 8/1964 |
| EP | 0814020 | 12/1997 |
| EP | 0927659 | 7/1999 |
| FR | 2695177 | 3/1994 |
| GB | 1077322 | 7/1967 |

OTHER PUBLICATIONS

French Search Report for FR0802366, dated Oct. 30, 2008.
French Search Report for FR 0802359, dated Nov. 7, 2008.
Co-pending U.S. Appl. No. 12/431,074, filed Apr. 28, 2009, entitled "An energy absorber element".

* cited by examiner

*Primary Examiner* — David Dunn
*Assistant Examiner* — David E Allred
(74) *Attorney, Agent, or Firm* — Brooks Kushman P.C.

(57) ABSTRACT

A crashworthy seat for a vehicle comprises a stand including a first and a second foot connected mechanically to a first and a second vertical support leg; a pan connected by the stand to a floor wherein the first and the second feet are disposed on each side of the pan, the pan including a seat proper and a seat back, wherein the seat back has a support element secured to the first and the second vertical support legs configured to support the seat back; a guide element configured to guide the pan in translation; an energy absorber device; a first anchor point secured to the first distal end of the absorber portion; and a second anchor point secured to the second distal end of the absorber portion.

19 Claims, 4 Drawing Sheets

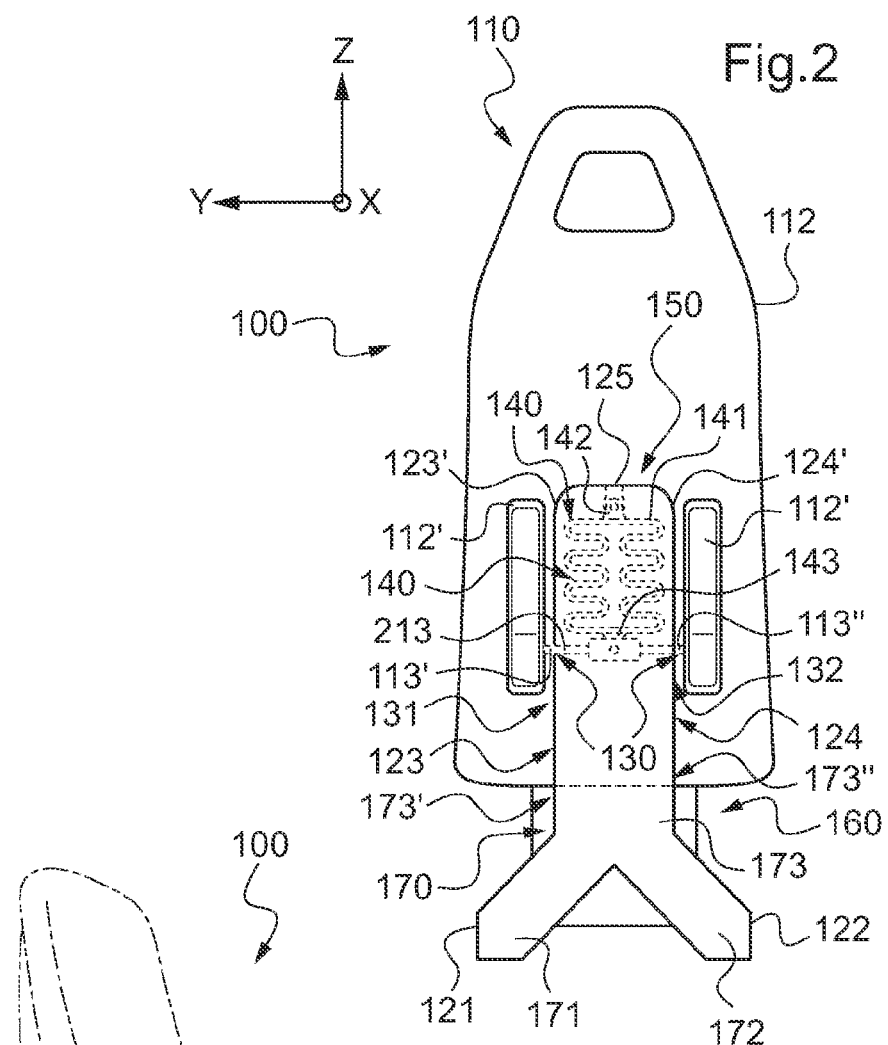
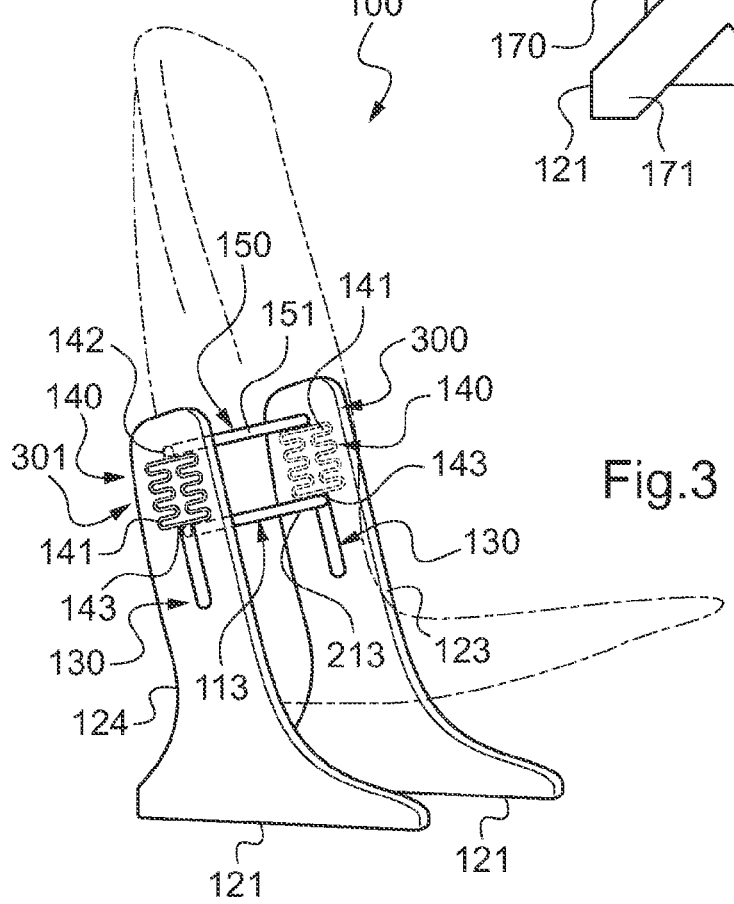

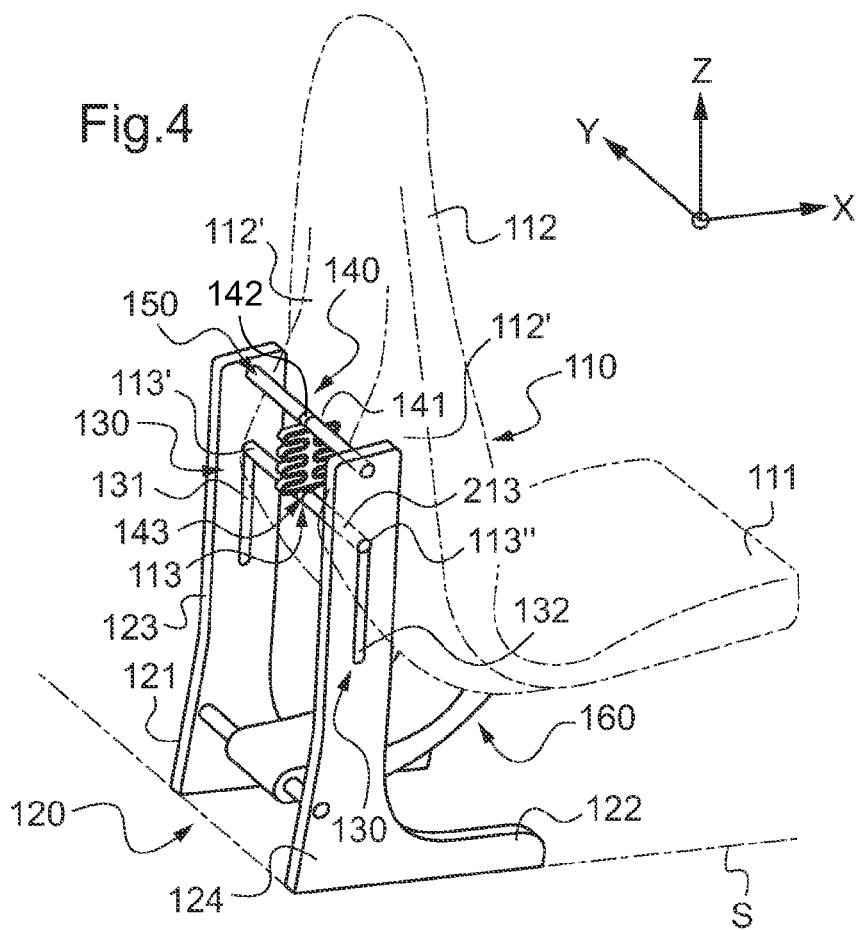
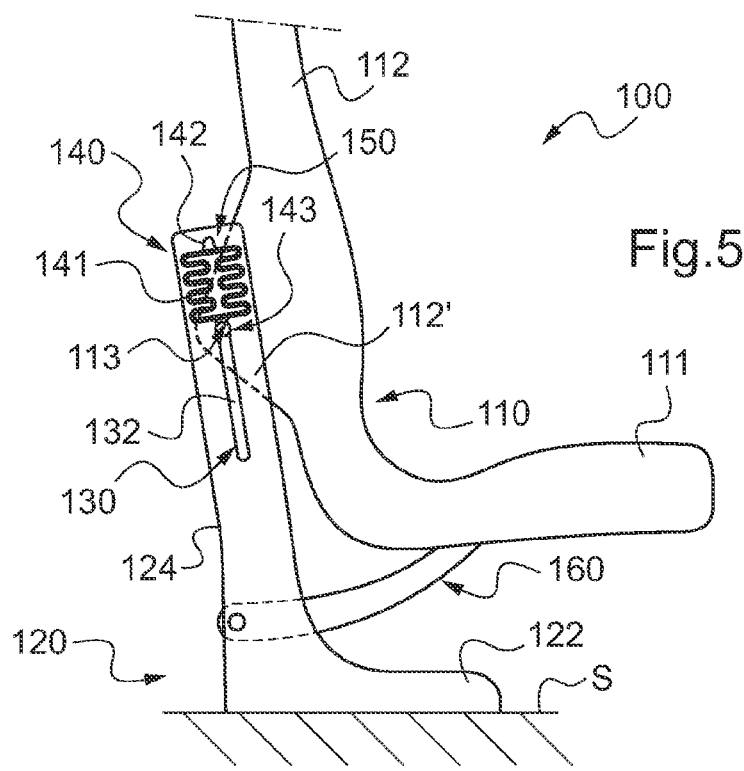

CRASHWORTHY SEAT FOR A VEHICLE

Priority is claimed to French Application No. FR 08 02359 filed Apr. 28, 2008, the entire disclosure of which is incorporated by reference herein.

The present invention relates to a crashworthy seat for a vehicle, more particularly a rotorcraft seat.

BACKGROUND

In the event of the vehicle crashing, it is appropriate to protect the physical integrity of passengers in the vehicle, and in particular to avoid a crushing phenomenon. In order to dissipate the energy due to the crash of the vehicle, seat manufacturers have opted for devices that dissipate the kinetic energy of the seat by crushing an element.

Document EP 0 814 020 describes a first seat of that type. According to document EP 0 814 020, a crashworthy seat for a vehicle comprises a pan and a stand for connecting the pan to the floor of the vehicle, the pan being provided with a seat proper and a seat back for receiving an individual. The stand is provided with first and second feet each extended by a vertical support element having a respective longitudinal rib. Furthermore, the back of the pan supports one fastener element per vertical support element. Consequently, each rib is engaged in a channel of the associated fastener element, the portion of the rib situated above the fastener element being of a cross-section that is smaller than the portion of the rib situated below said fastener element. In the event of the vehicle, e.g. a helicopter, crashing, the downward movement of the vehicle is stopped violently and suddenly when the vehicle makes contact with the ground. Because of its inertia, the assembly comprising the pan and the individual thereon tends to continue moving downwards and the fastener elements slide along the ribs which then act as guide means. Furthermore, the fastener elements plane or shave the rib as they move downwards, thereby enabling said rib to perform the function of an energy absorber, specifically absorbing the energy resulting from the kinetic energy of the pan and the individual occupying it. Consequently, the deceleration to which the pan and said individual is subjected is reduced significantly by the ribs of the vertical support elements.

That first seat thus provides means acting both as guide means and as absorber means, with the removal of material from said absorber means turning out to be very effective. Nevertheless, after a crash, the vertical support elements and the fastener elements need to be replaced, which gives rise to non-negligible costs.

Document EP 0 078 479 discloses a second crashworthy seat provided with a first structure having a pan and a frame fastened to the pan. In addition, the second seat is provided with two columns suitable for being fastened to structural parts of a vehicle. The frame has two sleeves, each sleeve being suitable for sliding on a respective column, thus performing the function of guide means.

In order to prevent the sleeves sliding under normal conditions, the seat has a plurality of bars fastened at their top ends to cap members arranged on the top ends of the columns. More precisely, the seat has one cap member per column, with each cap member being fitted with four bars. Furthermore, each column is surrounded by a drawing die, itself surrounded by a collar. The bars of a column pass through a drawing passage formed in the drawing die of the column. It should be observed that the diameter of each bar below the drawing die is larger than the diameter of the drawing passage. Consequently, as for the first seat, in the event of the pan moving downwards rapidly as the result of a crash, the bars are deformed by the drawing die, thus enabling a large amount of energy to be absorbed.

In contrast, the guide means, i.e. the columns, are here dissociated from the absorber means, i.e. the bar. After the crash, only the bars and the drawing matrix need to be changed, and that enables costs to be limited. Nevertheless, in practice, such replacement requires the seat to be completely dismantled. Furthermore, the fabrication costs of the seat remain relatively large because of their close fabrication tolerances.

SUMMARY OF THE INVENTION

An aspect of the present invention is to provide a low-cost vehicle seat that requires only limited maintenance action after a crash.

According to the present invention, a crashworthy seat of a vehicle comprises a pan and a stand for connecting the pan to the floor of the vehicle, the pan being provided with a seat proper and with a seat back for receiving an individual, the stand being provided with first and second feet suitable for being fastened to the floor on either side of the pan, these first and second feet being mechanically connected to first and second vertical support legs for supporting the back.

The seat is remarkable in that it includes support means secured to the first and second vertical support legs, together with guide means for guiding the pan in translation and energy absorber means that are distinct, the guide means co-operating with the control means to guide the movement of the pan in translation in a predetermined direction during a crash, the absorber means co-operating with the control means and the support means to absorb the kinetic energy of the seat in order to control the deceleration to which the individual sitting on the seat is subjected.

Consequently, during a crash, the absorber means are deformed, a portion of the absorber means being held stationary by the support means, while the control means pull on another portion of the absorber means. The elastic or plastic deformation of the absorber means then enables them to absorb energy. After a crash, or a hard landing of the helicopter, if the absorber means have been deformed plastically, it suffices merely to replace the absorber means in order to make the seat reusable.

Advantageously, the absorber means are provided with at least one absorber element that deforms plastically in pure traction, such as an absorber element of the invention. Below, it is explained how it is possible to use a plurality of absorber elements to obtain desired characteristics depending in particular on the weight of the pan and the weight of the passenger it supports.

Prior art seats operate by paring away material, which involves fabrication tolerances that are very close and thus fabrication costs that are large. In contrast, the use of absorber elements optionally comprising one or more additional characteristics as described below, can be implemented easily, thereby considerably reducing the cost of the seat.

For example, an energy absorber element is provided with an absorber portion, a first anchor point, and a second anchor point, and first and second distal ends of the absorber portion are secured respectively to the first and second anchor points. In addition, the absorber portion includes at least one solid elongate element, possibly of constant thickness, that deforms elastically when stressed in traction below a predetermined threshold and plastically when stressed in traction above the predetermined threshold, said at least one elongate element being provided with a succession of mutually parallel straight-line segments and of circularly-arcuate segments so as to have at least two successive straight-line segments interconnected by a circularly-arcuate segment. As used herein, parallel is understood to mean substantially parallel.

When traction is applied to the second anchor point, each circularly-arcuate segment tends to unfold, being deformed elastically or plastically, with this elastic or plastic deformation giving it the ability to absorb energy.

By definition, the elongate element of the absorber portion of the absorber element is of a shape that is very long relative to its transverse size, the developed length of each elongate element being much greater than its thickness. Thus, the elongate element may be a wire presenting a section that may be of a variety of shapes, and not necessarily circular. In addition, the elongate element is advantageously made of a metal material so as to present characteristics that are good in terms of elastic and plastic deformation.

In addition, in spite of its low cost, the absorber element is particularly strong, thus enabling it to be used in a crashworthy seat. Furthermore, each of the first and second distal ends advantageously comprises a respective straight-line segment, thereby making it easier to secure to the corresponding first or second anchor points.

In addition, the absorber element has a plurality of circularly-arcuate segments, each presenting a concave side, a first circularly-arcuate segment being connected to a following second circularly-arcuate segment by a straight-line segment, and the first concave side of said first circularly-arcuate segment facing in a first direction opposite to a second direction in which the second concave side of said second circularly-arcuate element faces.

Thus, the elongate element presents an undulating shape zigzagging back and forth. This characteristic makes it easier for the absorber element to lengthen, thereby maximizing its energy-absorption power. Furthermore, each circularly-arcuate segment is optionally in the form of a regular semicircle and/or has a radius greater than or equal to two millimeters. For the person skilled in the art, this amounts to saying that each circularly-arcuate segment represents a portion of a geometrical circle of radius greater than or equal to two millimeters. Thus, the elongate element does not present high stress concentrations and therefore does not risk breaking inopportunely.

To optimize the effectiveness of the absorber element, the absorber element does not have one elongate element, but rather has two elongate elements facing each other and connected together solely via the straight-line segments of their end zones. Each elongate element has a primary straight-line segment in its first end zone and a secondary straight-line segment in its second end zone, with the first and second elongate elements being connected together solely via their end zones so as to form the first and second distal ends of the absorber portion. Thus, the primary straight-line segment of the first end zone of the first elongate element is secured to the primary straight-line segment of the first end zone of the second elongate element to form the first distal end of the absorber portion, these primary straight-line segments thus forming a single straight-line segment to which the first anchor point is secured.

Likewise, the secondary straight-line segment of the second end zone of the first elongate element is secured to the secondary straight-line segment of the second end zone of the second elongate element to form the second distal end of the absorber portion, these secondary straight-line segments thus forming a single straight-line segment to which the second anchor point is secured.

In addition, each elongate element has identical intermediate straight-line segments of a first length between its primary and secondary straight-line segments, the primary and secondary straight-line segments being identical and having a second length, the second length being longer than the first length.

It can be understood that each elongate element has a plurality of straight-line segments, the straight-line segment of the first end zone of an elongate element being referred to as the primary straight-line segment, the straight-line segment of the second end zone of an elongate element being referred to as the secondary straight-line segment, and the straight-line segments lying between the straight-line segment of the first end zone and the straight-line segment of the second end zone being referred to as intermediate straight-line segments, for reasons of clarity. Consequently, the first length of the straight-line segments lying between the straight-line segment of the first end zone and the straight-line segment of the second end zone is less than the second length of the straight-line segments of the first and second end zones. Thus, each circularly-arcuate segment of the second elongate element is spaced apart from each circularly-arcuate segment of the first elongate element so as to avoid touching, thereby enhancing the capacity of the absorber element to lengthen in traction.

Furthermore, the first and second elongate elements are identical and disposed facing each other, with each straight-line segment of the second elongate element being in line with a straight-line segment of the first elongate element. Likewise, each circularly-arcuate segment of the second elongate element is spaced apart from each circularly-arcuate segment of the first elongate element so as to avoid them touching.

Finally, it is advantageous to have a one-piece absorber element with the elongate element(s) of the absorber element and the first and second anchor points all being obtained by machining a single block of material. In addition, the absorber portion is ideally contained in a plane so as to work in a preferred direction in order to maximize its effectiveness, said block of material then being in the form of a plane plate. Consequently, the absorber element, and thus its absorber portion and each of its elongate elements made from said plane plate, all lie in a common plane. The cost of fabricating the absorber element is thus relatively low, while the performance of the absorber elements is optimized.

Furthermore, the seat of the invention may include one or more of the following additional characteristics.

The first and second vertical support legs are optionally symmetrical relative to each other and/or identical. Likewise, the first and second feet are optionally symmetrical to each other and/or identical. Furthermore, the seat includes support means secured to the first and second vertical support legs, a first anchor point of said at least one absorber element is fastened to the support means, and a second anchor point of said absorber element is fastened to the control means secured to the back of the pan. When the pan moves down vertically relative to the vertical legs, possibly each contained in a vertical plane parallel to the feet, the second anchor point of each absorber element is caused to move with the pan by the control means. In contrast, the first anchor point of each absorber element remains stationary. The traction exerted on each absorber element enables it to dissipate the energy resulting from the kinetic energy of the seat.

In a first embodiment, said at least one absorber element of the absorber means is contained in a first plane perpendicular to the vertical support legs and parallel to the seat back of the seat. Advantageously, the support means is then provided with a plate resting on first and second top ends of the first and second vertical support legs respectively. The first anchor points of the absorber elements are then fastened to the plate of the support means using conventional means. Furthermore, the guide means include first and second slots formed respectively in the first and second vertical support legs, first and second free ends of a control bar of the control means passing through the first and second slots, the control bar of the control means being secured to the second anchor point and to at least one fastener means of said seat back, such as a projection made on the seat back. Downward movement of the seat, and of its control bar is thus indeed guided by the slots of the guide means in the direction of the vertical support legs.

In second and third embodiments, said at least one absorber element is contained in a second plane parallel to the vertical support legs and perpendicular to the seat back of the pan. Advantageously, the support means are provided with a support bar connecting together the first and second vertical support legs by being secured solely to the first and second vertical support legs, and thus not to the pan of the seat, the support bar passing through the first anchor point of said at least one absorber element. As used herein, perpendicular is understood to mean substantially perpendicular.

In the second embodiment, the absorber means includes at least one absorber element per vertical support leg, at least one absorber element being fastened via its first anchor point to each vertical support upright by the support means. It is possible to provide a single support bar or two support bars, each supporting the absorber element(s) of a vertical support leg.

With reference to a first configuration of this second embodiment, the control means comprise a single control bar passing through the first and second slots and the second anchor point of each associated absorber element. In addition, the control bar is secured to the seat back of the pan by being fastened to at least one fastener means of said seat back, the control bar passing through a projection formed on said seat back, for example.

In a second configuration, the guide means comprise first and second slots formed respectively in the first and second vertical support legs, first and second control bolts of the control means passing respectively through the first and second slots and the second anchor point of the associated absorber elements. In order to enable the control means to be secured to the seat back of the pan, the first and second control bolts of the control means also pass through fastener means of the seat back, e.g. projections.

In a third embodiment, the guide means include first and second slots formed respectively in the first and second vertical support legs, first and second free ends of a control bar of the control means passing through the first and second slots, the control bar being secured to the second anchor point and to at least one fastener means of the seat back. Furthermore, the seat is optionally provided with pan holder means for improving its stability and preventing the pan from turning about the control means. For example, the holder means comprise at least one connecting rod hinged firstly to the pan and secondly to a crank pin mechanically connected to at least one foot.

In a first variant of the holder means, the holder means comprise a connecting rod hinged firstly to the bottom face of the seat proper of the pan facing away from the top face of the seat on which an individual sits, and secondly to a crank pin fastened to at least one of the two feet.

In a second variant of the holder means, the holder means are provided with first and second connecting rods hinged to the bottom face of the seat proper, the first connecting rod also being hinged to a first crank pin fastened to the first foot, while the second connecting rod is hinged to a second crank pin fastened to the second foot.

In a third variant of the holder means, the first and second connecting rods are fastened to a single crank pin that is secured to at least one of the feet.

Furthermore, in a first variant of the stand, the first and second vertical support legs extend the first and second feet respectively, to form first and second vertical strength members.

In a second variant of the stand, the seat includes a upside-down Y-shaped load-carrying surface provided with first and second bottom branches and a single top branch, said first and second feet being respectively secured laterally to the first and second bottom branches, while said first and second vertical support uprights are secured laterally to said top branch.

BRIEF DESCRIPTION OF THE DRAWINGS

The invention and its advantages appear in greater detail from the following description of embodiments given by way of illustration with reference to the accompanying figures, in which:

FIG. 2 is a diagrammatic view of a seat in a first embodiment of the invention of the invention;

FIG. 3 is a simplified diagrammatic isometric view of a seat in a second embodiment of the invention;

FIGS. 4 and 5 are an isometric view and a side view in a seat in a third embodiment;

Elements shown in more than one of the figures are given the same references in each of them.

DETAILED DESCRIPTION

Three mutually orthogonal directions written X, Y, and Z are shown in FIGS. 1 to 5. The direction X is said to be "longitudinal". Another direction Y is said to be "transverse". Finally, a third direction Z is said to be an "elevation" direction and corresponds to the height dimensions of the structures described.

Figure 1:
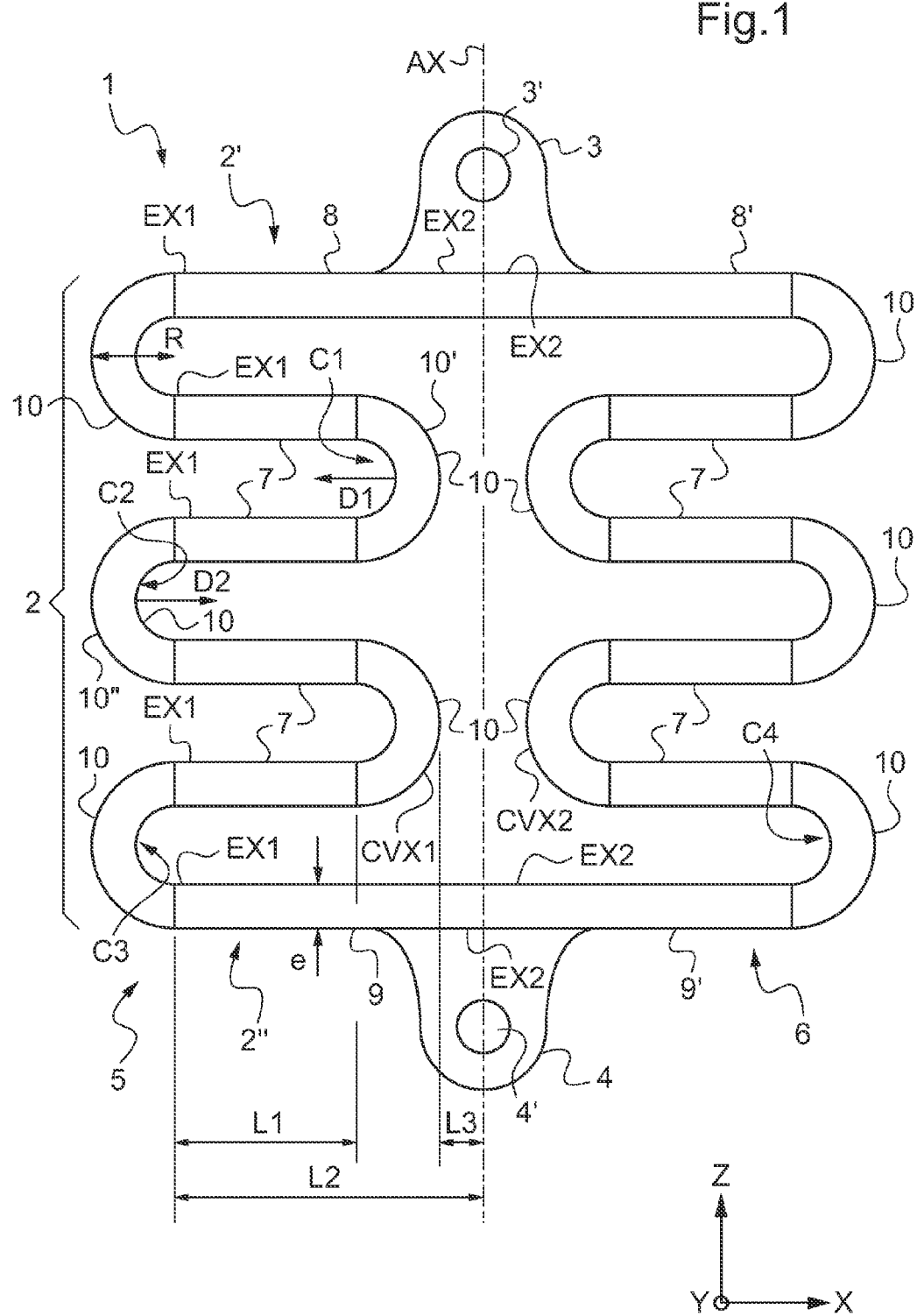
FIG. 1 is a face view of an absorber element of the invention.

FIG. 1 is a section view of a plane absorber element 1 of the invention. The absorber element comprises in succession a first anchor point 3, an absorber portion 2, and then a second anchor point 4. It can be seen that the first distal end 2' of the absorber portion 2 is secured to the first anchor point 3, while the second distal end 2" of the absorber portion 2 is secured to the second anchor point 4. It should be observed that the first and second anchor points 3, 4 are each provided with respective fastener orifices 3', 4', and also that the absorber portion may constitute a single piece obtained by machining a single block of material, e.g. by being cut out from a metal plate. By pulling on the second anchor point 4 while keeping the first anchor point 3 stationary, traction is exerted on the absorber portion. This traction may be initiated by the downward movement of a helicopter seat pan while the helicopter is landing hard. The absorber portion 2 then deforms plastically so as to absorb the kinetic energy of the pan so as to slow down and reduce its descent. Firstly, the absorber portion comprises an elongate element 5 of constant thickness e made up of six mutually parallel straight-line segments 7, 8, 9 directed in the longitudinal direction X, and five circularly-arcuate segments 10.

It should be observed that these numbers of straight-line segments and of circularly-arcuate segments as mentioned above are purely indicative and are not limiting. The first elongate element should have at least two straight-line segments interconnected by one circularly-arcuate segment. The first elongate element thus comprises a succession of straight-line and circularly-arcuate segments, a straight-line segment 7, 8, or 9 succeeding and/or preceding a circularly-arcuate segment 10, and a circularly-arcuate segment 10 succeeding and/or preceding a straight-line segment 7, 8, or 9. More precisely, the first distal end 2' of the absorber element 1, and thus the first end zone 2' of the first elongate element 5, is provided with a primary straight-line segment 8. Similarly, the second distal end 2" of the absorber element 1, and thus the second end zone 2" of the first elongate element 5, is provided with a secondary straight-line segment 9. The primary and secondary straight-line segments 8 and 9 are identical and they extend over a second length L2. Between these first and second end zones 2' and 2", the straight-line segments are intermediate straight-line segments 7, each extending over a first length L1 that is shorter than the second length L2. Finally, the straight-line segments are placed one above another. Furthermore, the circularly-arcuate segments 10 are all identical and they present a radius R that is greater than two millimeters.

It should be observed that the difference between the second length L2 and the first length L1 is greater than the radius R, which means that the inner ends EX2 of the primary and secondary straight-line segments 8 and 9 form projections relative to the first elongate element 5.

Furthermore, the first and second concave sides C1, C2 of two successive circularly-arcuate segments 10' and 10", i.e. two segments connected to common intermediate straight-line segments, are directed in first and second directions D1, D2 that are parallel and opposite, these first and second directions D1 and D2 not coinciding. The first elongate element 5 is thus of an undulating shape. Secondly, the absorber portion 2 has a second elongate element 6. It should be observed that the second elongate element 6 is not essential. With reference to FIG. 1, the second elongate element 6 is identical to the first elongate element 5. In addition, the second elongate element 6 is symmetrically secured to the first elongate element 5 about the axis of symmetry AX of the absorber element. The first and second elongate elements 5 and 6 thus face each other.

More precisely, the first and second elongate elements are secured to each other solely via their first and second end zones 2' and 2". Thus, the primary straight-line segment 8 of the first elongate element 5 is secured to the primary straight-line segment 8' of the second elongate element 6, the secondary straight-line segment 9 of the first elongate element 6 being secured to the secondary straight-line segment 9' of the second elongate element 6. Because of the symmetry of the first and second elongate elements 5, 6, each straight-line segment of the second elongate element 6 is in alignment with a straight-line segment of the first elongate element 5, but does not touch it. Similarly, each circularly-arcuate segment of the second elongate element 5 is in alignment with a circularly-arcuate segment of the first elongate element 5, but does not touch it.

Thus, each outer circularly-arcuate segment of the first elongate element 5 is at a second length L2 from the axis of symmetry AX, having its concave side facing the concave side of an outer circularly-arcuate segment of the second elongate element 6, that is itself at a second length L2 from the axis of symmetry AX. By way of example, the concave sides C3 and C4 thus face each other. Furthermore, two aligned outer circularly-arcuate segments of the first and second elongate elements 5 and 6 are spaced apart from each other by a distance corresponding to twice the second length L2, i.e. the sum of the second lengths L2 of the primary or secondary straight-line segments 8, 8', or 9, 9'.

In contrast, each inner circularly-arcuate segment of the first elongate element 5 is at a third length L3 from the axis of symmetry AX that is equal to the second length L2 minus the radius R and minus the first length L1, with its convex side facing the convex side of an outer circularly-arcuate segment of the second elongate element 6 that is likewise at a third length L3 from the axis of symmetry AX that is equal to the second length minus the radius R and the first length L1. By way of example, the convex sides CVX1 and CVX2 thus face each other. Furthermore, two inner and aligned circularly-arcuate segments of the first and second elongate elements 5 and 6 are spaced apart by a distance corresponding to twice the third length L3.

FIGS. 2 to 5 are views of crashworthy seats in first, second, and third embodiments. Whatever the embodiment, e.g. with reference to FIGS. 4 and 5, a crashworthy seat 100 comprises a pan 110 provided with a seat proper 111 and a seat back 112 on which an individual can sit. Furthermore, the seat 100 has a stand 120 for connecting the pan 110 to the floor S of a vehicle, e.g. a helicopter.

The stand 120 is provided firstly with first and second feet 121 and 122 that are symmetrical and/or identical, each secured to the floor S, and secondly with first and second identical vertical support legs 123 and 124, serving in particular for supporting the seat back 112 of the pan 110. In terms of orientation, the seat back 112 of the pan 110 and the first and second vertical support legs 123 and 124 are directed along the elevation axis Z, while the first and second feet 121 and 122 and the seat proper 111 of the pan 110 are directed along the longitudinal axis X. Furthermore, it can be seen that the first and second vertical support legs 123 and 124 are contained in respective first and second planes parallel to the first and second feet.

Furthermore, the seats 100 shown in the figures include respective guide means 130 and energy absorber means 140, each co-operating with control means 113 secured to the seat back 112 of the pan 110 by fastener means, e.g. fins projecting from the back of the seat back, for example. Furthermore, each of these seats is provided with optional holder means 160 that co-operate with the pan 110 and the stand 120. Consequently, when the vehicle fitted with the seat 100 lands hard, e.g. during a crash, the pan continues to move downwards because of its inertia. The guide means then guide the movement of the pan 110, the absorber means absorbing a fraction of the kinetic energy of the seat in order to slow down and stop the downward movement of the pan so as to protect the physical integrity of the person sitting on the seat. In this context, the guide means are provided with first and second slots 131, 132 formed respectively in the first and second vertical support legs 123 and 124.

The absorber means has at least one absorber element 141 that deforms plastically when subjected to pure traction, e.g. such as an absorber element 1 as described with reference to FIG. 1. The or each absorber element is then fastened via the first anchor point 142 to the support means 150, and via the second anchor point 143 to the control means 113.

With reference to FIG. 2, in the first embodiment, the absorber means 140, and thus all of the absorber elements 141 are arranged in a first plane (Y,Z) perpendicular to the first and second vertical support legs 123 and 124 and parallel to the seat back 112 of the pan 110. It should be observed that the absorber means 140 may comprise a plurality of absorber elements 141 arranged in parallel, i.e. one behind another.

In this first embodiment, the absorber means 150 are made up of a plate 125 secured to first and second top ends 123' and 124' respectively of the first and second vertical support legs 123 and 124 respectively. The first anchor point 142 of the absorber element 141 is then fastened to the plate 125 of the support means 150 via a peg that passes through the first anchor point and fastener means of the plate 125. Furthermore, the control means 113 are provided with a control bar 213 having first and second ends 113' and 113" that pass through the first and second slots 131 and 132 of the guide means 130, and that can thus slide in these slots. The first and second slots 131 and 132 thus guide the movement of the control bar 213 that is secured to the pan 110 and consequently they thus guide the movement of the pan 110. For this purpose, the first and second free ends 113' and 113" are secured to the fastener fins 112' of the back 112. Consequently, when the pan moves downwards, it entrains the control rod 213. In contrast, the support plate 125 remains in position because it is attached to the first and second vertical support legs 123 and 124.

Consequently, the control bar 213 exerts pure traction on the absorber elements 131 of the energy absorber means, with the absorber means thus absorbing the energy coming from the kinetic energy of the pan 110.

In the second embodiment, as shown diagrammatically in FIG. 3, and in the third embodiment, as shown diagrammatically in FIGS. 4 and 5, the absorber means 140, and thus all of the absorber elements 141, are arranged in a first plane (X,Z) parallel to the first and second vertical support legs 123 and 124 and perpendicular to the seat back 112 of the pan 110. The absorber means are made up of first and second groups 300 and 301 of absorber elements arranged respectively against the first and second vertical support legs 123 and 124. Thus, the first group 300 is fastened to the first vertical support leg 123 via the first anchor point 142 of the or each of its absorber elements 141 via the support means, the second group 301 being fastened to the second vertical support leg 124 by the first anchor point 142 of the or each of its absorber elements 141 via the support means.

In the first option shown in FIG. 3, the support means comprise a support bar 151 passing through the first and second vertical support legs 123 and 124 and then through the first and second anchor points of the absorber elements of the first groups 300 and 301.

In a second option (not shown), the support means comprise first and second support bars 151 passing respectively through the first and second vertical support legs 123 and 124 and then through the first and second anchor points of the absorber elements of the first and second groups 300 and 301. Similarly, with reference to a first configuration of this second embodiment, the control means have a single control bar 213 that passes through the first and second slots 131 and 132 and the second anchor points 143 of the or each associated absorber element.

In a second configuration (not shown), the guide means comprise first and second slots formed respectively in the first and second vertical support legs, first and second control bolts of the control means 113 passing respectively through the first and second slots and the second anchor points 143 of the or each associated absorber element. Furthermore, these first and second control bolts of the control means 113 pass through fastener means of the seat back of the pan, for example through fins of said back.

FIGS. 4 and 5 show a third embodiment. The guide means comprise first and second slots 131 and 132 formed respectively in the first and second vertical support legs 123 and 124, first and second free ends 113' and 113" of a control bar 213 of the control means 113 passing through the first and second slots 131 and 132, the control bar 213 being secured to the second anchor point 143 and at least one fastener means of the seat back, e.g. fins 112' of the back. The first free end 113' of the control bar 213 passes through the first slot 131 and thus can slide in said first slot 131. Similarly, the second free end 113' of the control bar 213 passes through the second slot 132 and can slide in said second slot 132. The first and second slots 131 and 132 thus guide the movement of the control bar 213 of the pan 110 and consequently the movement of the pan 110. Furthermore, the seat 100 possesses a support bar 150 that is independent of the pan 110, being secured to the first and second vertical support legs 123 and 124.

The absorber element 141 has first and second anchor points 142 and 143, and the support bar 150 passes through a first orifice of the first anchor point 142 while the control bar passes through a second orifice of the second anchor point. Furthermore, in a first variant of the stand shown in FIGS. 3 to 5, the first and second vertical support legs 123 and 124 extend the first and second feet 121, 122 respectively.

Thus, the first foot 121 and the first vertical support leg 123 form a single part, i.e. a first vertical strength member. Similarly, the second foot 112 and the second vertical support leg 124 form a single part, namely a second vertical strength member. The first and second vertical support means 123 and 124 may also be placed symmetrically relative to a plane of symmetry in elevation of the pan, and/or they may be identical.

In a second variant of the stand shown in FIG. 2, the seat includes a load-carrying structure 170 in the form of an upside-down Y-shape that is provided with first and second bottom branches 171 and 172 together with a top branch 173.

The first and second bottom branches 171 and 172 are fastened to the first and second feet 121 and 122, the first and second vertical support legs 123 and 124 being fastened on the side edges 173' and 173" of the top branch 173 facing the first and second feet 121 and 122. Furthermore, whatever the embodiment, the seat 100 may include holder means 160 provided both with at least one connecting rod 161 and with at least one crank pin 162.

Figure 6:
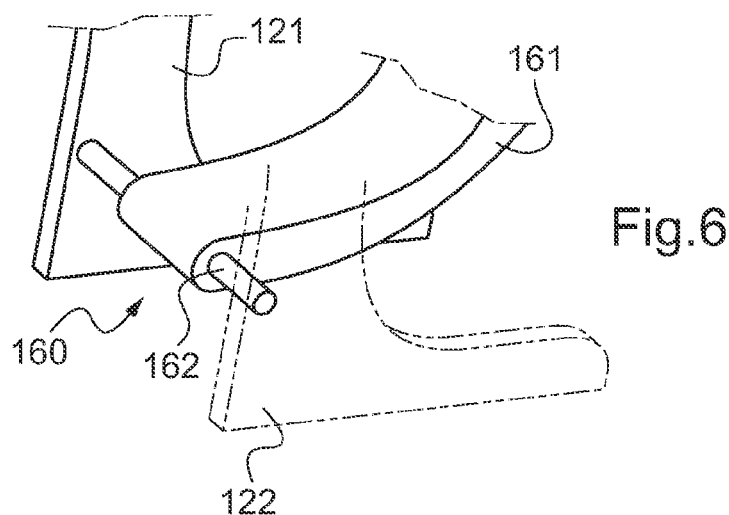
FIG. 6 is a diagrammatic view of a first variant of holder means.

In a first variant of the holder means, as shown in FIG. 6, the holder means 160 are provided with a connecting rod 161 hinged firstly to the seat proper of the seat pan and secondly to a crank pin 162. In addition, the crank pin 162 is hinged to the first and second feet 121 and 122 so as to be capable of performing rotary movement.

Figure 7:
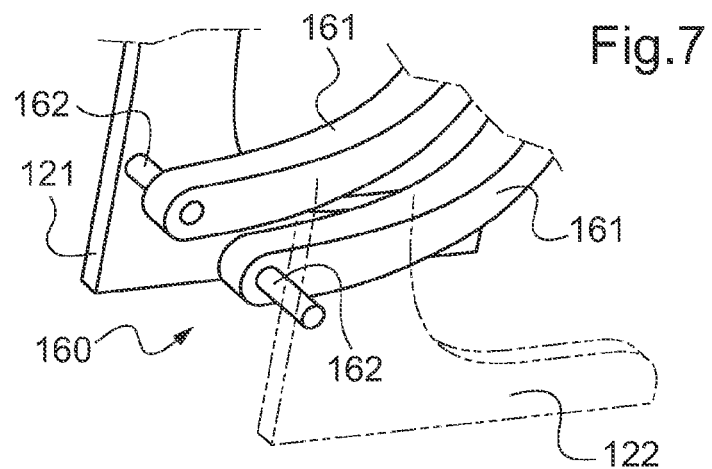
FIG. 7 is a diagrammatic view of a second variant of holder means.

In the second variant of the holder means, as shown in FIG. 7, the holder means 160 are provided with two connecting rods 161, both of which are hinged to the seat proper of the seat pan, and each is hinged to a respective crank pin 162. Furthermore, each crank pin 162 is hinged to a respective foot so as to be capable of performing rotary movement, the first crank pin being hinged to the first foot 121, while the second crank pin is hinged to the second foot 122.

Figure 8:
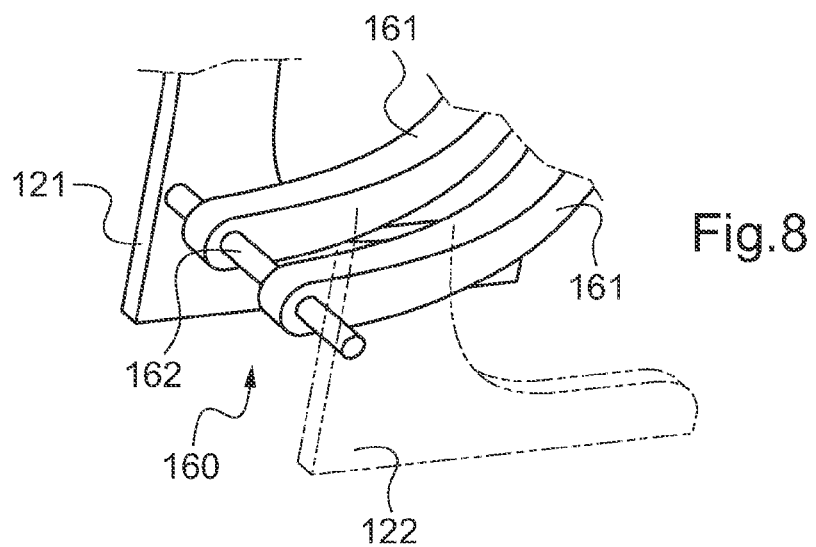
FIG. 8 is a diagrammatic view of a third variant of holder means.

Finally, in the third variant of the holder means, as shown in FIG. 8, the holder means 160 are provided with two connecting rods 161, both of which are hinged firstly to the seat proper of the seat pan, and secondly to a single crank pin 162. Furthermore, the crank pin 162 is hinged to the first and second feet 121 and 122 in such a manner as to be capable of performing rotary movement.

The present invention can be subjected to numerous implementation variations. Although several embodiments are described above, it will readily be understood that it is not conceivable to identify exhaustively all possible embodiments. It is possible to envisage replacing any of the means described by equivalent means without thereby going beyond the ambit of the present invention. For example, the holder means described in the figures are provided with at least one connecting rod 161 hinged firstly to the pan and secondly to a crank pin 162 mechanically linked to at least one foot. Nevertheless, it is possible to devise other types of holder means.

The holder means may thus include first and second slideways, such as slots, formed in the first and second vertical support legs close to the feet. These first and second slideways then co-operate with a rod secured to the pan, said rod preventing the pan from performing rotary movement about the control means. In a variant, it is also possible to provide control means of shape that is elongate in the direction of the guide means in the direction of the first and second slots of the guide means.

What is claimed is:

1. A crashworthy seat for a vehicle comprising:
   a stand including a first and a second foot connected mechanically to a first and a second vertical support leg;
   a pan connected by the stand to a floor wherein the first and the second feet are disposed on each side of the pan, the pan including a seat proper and a seat back, wherein the seat back has a support element secured to the first and the second vertical support legs configured to support the seat back; a guide element configured to guide the pan in translation;
   an energy absorber device;
   wherein the guide element and the energy absorber device are configured to communicate with a control element secured to the seat back, the control element configured to guide a movement of the pan in translation in a predetermined direction during a crash and the energy absorber device configured to absorb kinetic energy of the seat so as to control a deceleration of the pan,
   wherein the energy absorber device includes at least one energy absorber element configured to deform plastically in traction and having an absorber portion having first and second distal ends and having a first elongate element and a second elongate element facing the first elongate element and connected to the second element solely at the first and second distal ends;
   a first anchor point located at the first distal end of the absorber portion; and
   a second anchor point located at the second distal end of the absorber portion,
   wherein each of the first and second elongate elements includes a succession of straight-line segments parallel to one another and at least one circularly-arcuate segment such that at least two successive straight-line segments are connected together by one of the at least one circularly-arcuate segments, wherein the first and the second elongate elements are solid elements and are defined by a constant thickness;
   wherein each succession of straight-line segments includes a primary straight-line segment disposed at the first distal end, and a secondary straight-line element disposed at the second distal end, wherein the primary straight-line segments of the first and second elongate elements are connected to each other and the secondary straight-line segments of the first and second elongate elements are connected to each other, and wherein the first and second elongate elements deform elastically when subjected to traction below a predetermined threshold and plastically when subjected to traction above the predetermined threshold.

2. The crashworthy seat as recited in claim 1, wherein the first and the second vertical support legs are symmetrical relative to one another.

3. The crashworthy seat as recited in claim 1, wherein the first and the second feet are symmetrical relative to one another.

4. The crashworthy seat as recited in claim 1, wherein the at least one circularly-arcuate segment includes a first circularly-arcuate segment having a first concave side facing in a first direction and connecting a first straight-line segment to a second straight-line segment in the plurality of straight-line segments and a second circularly-arcuate segment having a second concave side facing in a second direction opposite the first direction and connecting the second straight-line segment to a third straight-line segment in the plurality of straight-line segments.

5. The crashworthy seat as recited in claim 4, wherein the first and second circularly-arcuate segments define a radius greater than or equal to two millimeters.

6. The crashworthy seat as recited in claim 1, wherein each succession of straight-line segments includes an intermediate straight-line segment disposed between the primary and the secondary straight-line segments and having a first length, and wherein the primary and the secondary straight-line segments have a second length greater than the first length.

7. The crashworthy seat as recited in claim 6, wherein the intermediate straight-line segment of the second elongate element is in alignment with the intermediate straight-line segment of the first elongate element, and wherein each of the first and second circularly-arcuate segments of the second elongate element is spaced apart from the respective first and second circularly-arcuate segments of the first elongate element.

8. The crashworthy seat as recited in claim 1, wherein the first and the second vertical support legs are contained in respective vertical planes parallel to at least one of the first and the second respective feet.

9. The crashworthy seat as recited in claim 1, wherein the first anchor point is fastened to the support element and the second anchor point is fastened to the control element.

10. The crashworthy seat as recited in claim 9, wherein the at least one absorber element is disposed in a first plain perpendicular to the vertical support legs and parallel to the seat back.

11. The crashworthy seat as recited in claim 10, wherein the support element includes a plate disposed on first and second top ends, respectively, of the first and the second vertical support legs.

12. The crashworthy seat as recited in claim 9, wherein the at least one energy absorber element is disposed in a second plane parallel to the first and the second vertical support legs and perpendicular to the seat back.

13. The crashworthy seat as recited in claim 12, wherein the support element includes a support bar secured to the first and the second vertical support legs and passing through the first anchor point.

14. The crashworthy seat as recited in claim 12, wherein the at least one energy absorber element includes two energy absorber elements, each being fastened via the first anchor point to a respective one of the first and second vertical support legs by the support element.

15. The crashworthy seat as recited in claim 10, wherein the guide element includes a first and a second guide slot disposed respectively in the first and the second vertical support legs, wherein a first and a second free end of a control bar of the control element pass through the first and the second slots.

16. The crashworthy seat as recited in claim 14, wherein a first and a second control bolt pass through a first and a second guide slot and the second anchor point.

17. The crashworthy seat as recited in claim 1, further comprising a holder element configured to hold the pan and including at least one connecting rod hinged to the pan and to a crank pin mechanically connected to at least one of the first and the second feet.

18. The crashworthy seat as recited in claim 1, wherein the first and the second vertical support legs extend the first and the second feet respectively to form a first and a second vertical strength member.

19. The crashworthy seat as recited in claim 1, further comprising an upside-down Y-shaped carrying structure having a first and a second bottom branch and a single top branch, wherein the first and the second feet are secured laterally to the first and the second bottom branches respectively, and wherein the first and the second vertical support legs are secured laterally to the single top branch.

* * * * *